(12) United States Patent
Kuroda et al.

(10) Patent No.: US 10,335,726 B2
(45) Date of Patent: Jul. 2, 2019

(54) GAS PURIFICATION DEVICE AND IMAGE FORMING APPARATUS

(71) Applicant: FUJI XEROX CO., LTD., Tokyo (JP)

(72) Inventors: Yoshitaka Kuroda, Kanagawa (JP); Kokichi Kasai, Kanagawa (JP); Tetsuya Kawatani, Kanagawa (JP); Satoshi Takada, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 38 days.

(21) Appl. No.: 15/459,201

(22) Filed: Mar. 15, 2017

(65) Prior Publication Data

US 2017/0182449 A1 Jun. 29, 2017

Related U.S. Application Data

(63) Continuation of application No. 14/600,612, filed on Jan. 20, 2015, now abandoned.

(30) Foreign Application Priority Data

Aug. 29, 2014 (JP) .................................. 2014-176175

(51) Int. Cl.
  *B01D 46/10* (2006.01)
  *G03G 21/20* (2006.01)
  *B01D 50/00* (2006.01)
(52) U.S. Cl.
  CPC ........... *B01D 46/10* (2013.01); *B01D 50/002* (2013.01); *G03G 21/206* (2013.01); *B01D 2279/45* (2013.01)

(58) Field of Classification Search
  None
  See application file for complete search history.

(56) References Cited

U.S. PATENT DOCUMENTS

| | | |
|---|---|---|
| 4,822,385 A | 4/1989 | Strege et al. |
| 5,141,538 A | 8/1992 | Derington et al. |

(Continued)

FOREIGN PATENT DOCUMENTS

| | | | |
|---|---|---|---|
| CN | 203196519 U | | 9/2013 |
| CN | 203253270 U | * | 10/2013 |

(Continued)

OTHER PUBLICATIONS

English machine translation of JP-2007310100-A (Year: 2007).*

(Continued)

*Primary Examiner* — David M. Gray
*Assistant Examiner* — Geoffrey T Evans
(74) *Attorney, Agent, or Firm* — Sughrue Mion, PLLC (57) ABSTRACT

A gas purification device includes an inflow port provided in an upper part of the gas purification device in a gravitational direction so that gas flows therein, a removing member that removes powder contained in the gas when the gas passes through the removing member, the removing member being disposed at a position such as not to overlap with the inflow port when viewed from above in the gravitational direction, and an outflow port provided in a lower part of the gas purification device in the gravitational direction so that the gas flows out therefrom after passing through the removing member.

9 Claims, 6 Drawing Sheets

(56) References Cited

U.S. PATENT DOCUMENTS

| | | | |
|---|---|---|---|
| 6,129,020 A * | 10/2000 | Speck | B41F 13/00 |
| | | | 101/425 |
| 9,176,472 B2 * | 11/2015 | Nakayama | F24F 13/28 |
| 9,261,858 B2 | 2/2016 | Satou et al. | |
| 2007/0158049 A1 * | 7/2007 | Kim | F24F 12/006 |
| | | | 165/48.1 |
| 2011/0008067 A1 * | 1/2011 | Okada | G03G 21/10 |
| | | | 399/92 |
| 2011/0200494 A1 | 8/2011 | Tanaka | |
| 2012/0240534 A1 * | 9/2012 | Ryuzaki | G03G 21/206 |
| | | | 55/385.4 |
| 2014/0119767 A1 | 5/2014 | Inami et al. | |
| 2014/0294429 A1 | 10/2014 | Inui et al. | |
| 2015/0098723 A1 * | 4/2015 | Mitorida | G03G 21/206 |
| | | | 399/92 |
| 2016/0124384 A1 | 5/2016 | Mizutani | |

FOREIGN PATENT DOCUMENTS

| | | | |
|---|---|---|---|
| JP | 02259219 A | | 10/1990 |
| JP | 2002229401 A | * | 8/2002 |
| JP | 2007-310100 A | | 11/2007 |
| JP | 2008-83132 A | | 4/2008 |
| JP | 2013145855 A | * | 7/2013 |

OTHER PUBLICATIONS

English machine translation of JP-2002229401-A (Year: 2002).*
Communication dated Mar. 20, 2018 from the Japanese Patent Office in counterpart application No. 2014-176175.

* cited by examiner

GAS PURIFICATION DEVICE AND IMAGE FORMING APPARATUS

CROSS-REFERENCE TO RELATED APPLICATIONS

This is a Continuation of application Ser. No. 14/600,612 filed Jan. 20, 2015 which claims priority under 35 USC 119 from Japanese Patent Application No. 2014-176175 filed Aug. 29, 2014. The entire disclosures of the prior application are considered part of the disclosure of the accompanying continuation application, and are hereby incorporated by reference.

BACKGROUND

Technical Field

The present invention relates to a gas purification device and an image forming apparatus.

SUMMARY

According to an aspect of the invention, there is provided a gas purification device including an inflow port provided in an upper part of the gas purification device in a gravitational direction so that gas flows therein, a removing member that removes powder contained in the gas when the gas passes through the removing member, the removing member being disposed at a position such as not to overlap with the inflow port when viewed from above in the gravitational direction, and an outflow port provided in a lower part of the gas purification device in the gravitational direction so that the gas flows out therefrom after passing through the removing member.

BRIEF DESCRIPTION OF THE DRAWINGS

Exemplary embodiments of the present invention will be described in detail based on the following figures, wherein:

FIGS. 3A and 3B are explanatory views of a gas purification device according to the first exemplary embodiment.

DETAILED DESCRIPTION

While exemplary embodiments will be next described as specific examples of the present invention with reference to the drawings, the present invention is not limited to the following exemplary embodiments.

For easy understanding of the following description, in each of the drawings, an X-axis direction represents the front-rear direction, a Y-axis direction represents the right-left direction, and a Z-axis direction represents the up-down direction. Directions or sides shown by arrows X, −X, Y, −Y, Z, and −Z represent the frontward direction, the rearward direction, the rightward direction, the leftward direction, the upward direction, and the downward direction, or the front side, the rear side, the right side, the left side, the upper side, and the lower side, respectively.

In each of the drawings, an encircled dot represents an arrow directed from the back side to the front side of the paper surface of the drawing, and an encircled cross represents an arrow directed from the front side to the back side of the paper surface of the drawing.

In the following description with reference to the drawings, illustrations of members other than members necessary for explanation are appropriately omitted for easy understanding.

First Exemplary Embodiment

Figure 1:
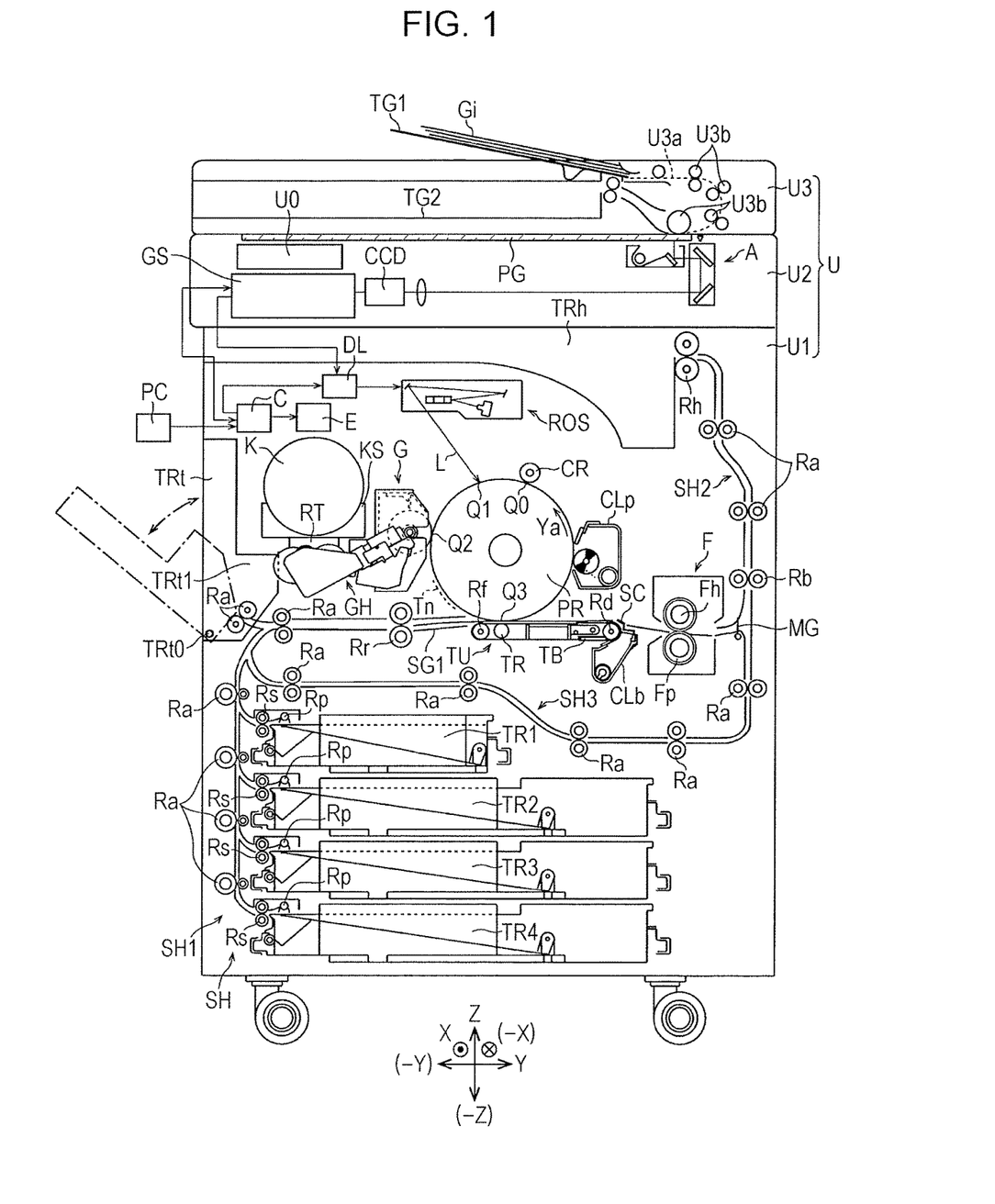
FIG. 1 is an explanatory view of an image forming apparatus according to a first exemplary embodiment of the present invention.

FIG. 1 is an explanatory view of an image forming apparatus according to a first exemplary embodiment of the present invention.

Referring to FIG. 1, a copying machine U serving as an example of an image forming apparatus of the first exemplary embodiment includes a printer section U1 serving as an example of a recording section and an example of an image recording device. On an upper side of the printer section U1, a scanner section U2 is supported as an example of a reading section and an example of an image reading device. On an upper side of the scanner section U2, an automatic feeder U3 is supported as an example of a document transport device. In the first exemplary embodiment, a user interface U0 is supported as an example of an input unit within the scanner section U2. The operator can perform input to the user interface U0 to operate the copying machine U.

On an upper side of the automatic feeder U3, a document tray TG1 is disposed as an example of a medium storage container. In the document tray TG1, plural documents Gi to be copied can be stacked and stored. Below the document tray TG1, a document output tray TG2 is provided as an example of a document output unit. Between the document tray TG1 and the document output tray TG2, document transport rollers U3b are arranged along a document transport path U3a.

On an upper surface of the scanner section U2, a platen glass PG is disposed as an example of a transparent document table. In the scanner section U2 of the first exemplary embodiment, a reading optical system A is disposed below the platen glass PG. The reading optical system A of the first exemplary embodiment is supported movably in the right-left direction along a lower surface of the platen glass PG. In a normal state, the reading optical system A remains at rest at an initial position illustrated in FIG. 1.

On the left side of the reading optical system A, an imaging element CCD is disposed as an example of an imaging member. An image processing unit GS is electrically connected to the imaging element CCD.

The image processing unit GS is electrically connected to a writing circuit DL in the printer section U1. The writing circuit DL is electrically connected to an exposure device ROS serving as an example of a latent-image forming device.

Below the exposure device ROS, a photoconductor drum PR is disposed as an example of an image carrier. The photoconductor drum PR rotates in a direction of arrow Ya.

In a charging area Q0, a charging roller CR serving as an example of a charging member is disposed opposed to the photoconductor drum PR.

To the charging roller CR, charging voltage is applied from a power supply circuit E. The power supply circuit E is controlled by a controller C serving as an example of a control unit. The controller C exchanges signals with the image processing unit GS, the writing circuit DL, and so on to perform various control operations. To the controller C of the first exemplary embodiment, a personal computer PC serving as an example of an information transmission device is connected via a connecting line for information exchange with the copying machine U. The controller C receives image information about an object to be printed, which is transmitted from the personal computer PC.

In a writing area Q1 set on the downstream side of the charging area Q0 in the rotating direction of the photoconductor drum PR, a laser beam L serving as an example of writing light is radiated from the exposure device ROS onto a surface of the photoconductor drum PR.

In a developing area Q2 set on the downstream side of the writing area Q1 in the rotating direction of the photoconductor drum PR, a developing device G is disposed opposed to the surface of the photoconductor drum PR.

On the left side of the developing device G, a cartridge K is disposed as an example of a developer storage container. The cartridge K is detachably mounted in a cartridge holder KS serving as an example of a container support member. Below the cartridge holder KS, a reserve tank RT is disposed as an example of a storage container that temporarily stores developer. The reserve tank RT and the developing device G are connected by a developer transport device GH.

On the downstream side of the developing area Q2 in the rotating direction of the photoconductor drum PR, a transfer area Q3 is set.

In a lower part of the printer section U1, paper feed trays TR1 to TR4 are detachably supported as an example of a medium storage container. The paper feed trays TR1 to TR4 store sheets S serving as an example of a medium.

On the left upper side of each of the paper feed trays TR1 to TR4, a pickup roller Rp is disposed as an example of a medium take-out member. On the left side of the pickup roller Rp, loosening rollers Rs are disposed as an example of a loosening member.

On the left side of the paper feed trays TR1 to TR4, a medium transport path SH1 extends upward. In the transport path SH1, plural transport rollers Ra are disposed as an example of a medium transport member. In the transport path SH1, registration rollers Rr serving as an example of a feed member are also disposed on the downstream side in the transport direction of the sheets S and on the upstream side of the transfer area Q3.

On the left side of the cartridge holder KS and so on, a manual feed tray TRt serving as a manual feed portion is set as an example of a medium storage container. In the first exemplary embodiment, the manual feed tray TRt is supported turnably on a turn center TRt0. Therefore, the manual feed tray TRt is movable between a retracted position shown by a solid line in FIG. 1 and a paper feed enabling position shown by a one-dot chain line in FIG. 1. In the first exemplary embodiment, in a state in which the manual feed tray TRt is moved to the retracted position, it is retracted with a part TRt1 thereof being received below the cartridge holder KS and on the left side of the reserve tank RT. Therefore, the total capacity and size of the copying machine U may be reduced.

In the transfer area Q3, a transfer unit TU serving as an example of a transfer device and an example of a medium transport device is disposed below the photoconductor drum PR. The transfer unit TU includes an endless transfer belt TB serving as an example of a medium transport member.

The transfer belt TB is rotatably supported by a driving roller Rd serving as an example of a driving member and a driven roller Rf serving as an example of a driven member.

On an inner side of the transfer belt TB, a transfer roller TR is supported as an example of a transfer unit. The transfer roller TR is disposed opposed to the photoconductor drum PR with the transfer belt TB being disposed therebetween. Therefore, an area where the transfer roller TR and the photoconductor drum PR are opposed to each other forms the transfer area Q3. Transfer voltage is applied from the power supply circuit E to the transfer roller TR.

At a right end of the transfer belt TB, a separation claw SC is disposed as an example of a medium separation member. Below the separation claw SC, a belt cleaner CLb serving as an example of a cleaner for the transfer device is disposed opposed to a surface of the transfer belt TB.

On the downstream side of the transfer area Q3 in the rotating direction of the photoconductor drum PR, a drum cleaner CLp serving as an example of a cleaner for the image carrier is disposed opposed to the surface of the photoconductor drum PR. In the first exemplary embodiment, the photoconductor drum PR, the charging roller CR, and the drum cleaner CLp are formed as a drum unit serving as an example of a detachable body, and the drum unit can be integrally exchanged and detachably mounted in the copying machine U.

On the right side of the transfer unit TU, a fixing device F is disposed as an example of a heat source member. The fixing device F includes a heating roller Fh serving as an example of a heating rotating member and a pressurizing roller Fp serving as an example of a pressurizing rotating member.

To the right side of the fixing device F, an output path SH2 extending upward is connected as an example of a medium transport path.

In the output path SH2, transport rollers Rb and output rollers Rh are disposed as an example of a medium transport member. The transport rollers Rb and the output rollers RH are rotatable normally and reversely to transport a medium.

On an upper surface of the printer section U1, a paper output tray TRh is provided as an example of a medium output portion.

On the lower side of the output path SH2, an inverting path SH3 is provided as an example of a medium transport path. In the first exemplary embodiment, the inverting path SH3 diverges from the output path SH2, extends downward, and joins the transport path SH1 on the upstream side of the registration rollers Rr in the sheet transport direction.

At a diverging portion between the output path SH2 and the inverting path SH3, a gate MG is disposed as an example of a transport-direction switching member. In the first exemplary embodiment, the gate MG is thin and elastically deformable, that is, the gate MG is formed by a so-called film. When a sheet S transported from the fixing device F is to pass through the gate MG, the gate MG is set to be pushed and elastically deformed by the sheet S to admit the sheet S into the output path SH2. When the sheet S is to be transported from the output path SH2 to the inverting path SH3, the gate MG is held in an elastically restored state to prevent the sheet S from entering the fixing device F and to guide the sheet S toward the inverting path SH3.

Description of Image Forming Operation

Plural documents Gi stored in the document tray TG1 sequentially pass over a document reading position on the platen glass PG, and are output to the document output tray TG2.

When the documents Gi are automatically transported and copied by using the automatic feeder U3, the reading optical system A remains at rest in the initial position and exposes the documents Gi that sequentially pass over the reading position on the platen glass PG.

When a document Gi placed on the platen glass PG by the operator is to be copied, the reading optical system A exposes and scans the document Gi on the platen glass PG while moving in the right-left direction.

Reflected light from the document Gi passes through the reading optical system A, and is collected at the imaging element CCD. The imaging element CCD converts the light reflected by the document Gi and collected at the imaging plane into electric signals.

The image processing unit GS reads and converts the electric signals input from the imaging element CCD into digital image writing signals, and outputs the image writing signals to the writing circuit DL in the printer section U1. The writing circuit DL outputs control signals to the exposure device ROS in accordance with the input image writing signals.

The surface of the photoconductor drum PR is charged by the charging roller CR in the charging area Q0. In the writing area Q1, a laser beam L output from the exposure device ROS forms an electrostatic latent image on the surface of the photoconductor drum PR. In the developing area Q2, the developing device G develops the electrostatic latent image, which is formed on the photoconductor drum PR and passes through the developing area Q2, into a toner image Tn serving as an example of a visible image. When the developer is consumed in the developing device G, the developer transport device GH operates and supplies developer from the cartridge K to the developing device G in accordance with the consumption.

Sheets S in each of the paper feed trays TR1 to TR4 are taken out by the pickup roller Rp at a preset paper feed time. When plural sheets S are taken out by the pickup roller Rp in a stacked state, they are separated one by one by the loosening rollers Rs. A sheet S passing between the loosening rollers Rs is transported to the registration rollers Rr by the plural transport rollers Ra.

A sheet S fed from the manual feed tray TRt also joins a transport path SH1, and is transported to the registration rollers Rr.

The sheet S transported to the registration rollers Rr is transported from a pre-transfer sheet guide SG1 serving as an example of a pre-transfer guide member toward the transfer area Q3 in synchronization with the time when the toner image Tn on the surface of the photoconductor drum PR moves to the transfer area Q3.

The sheet S transported from the registration rollers Rr is supported on the surface of the transfer belt TB, and passes through the transfer area Q3. The toner image Tn on the surface of the photoconductor drum PR is transferred onto the sheet S passing through the transfer area Q3 by transfer voltage applied to the transfer roller TR.

After the surface of the photoconductor drum PR passes through the transfer area Q3, residual toner thereon is removed and cleaned by the drum cleaner CLp. After cleaning, the surface of the photoconductor drum PR is charged again by the charging roller CR.

The sheet S on which the toner image Tn has been transferred is separated from the transfer belt TB by the separation claw SC. After the sheet S is separated from the transfer belt TB, deposits, such as developer and paper dust, adhering to the surface of the transfer belt TB are removed by the belt cleaner CLb. When the sheet S separated from the transfer belt TB passes through the contact area between the heating roller Fh and the pressurizing roller Fp, the toner image Tn is fixed with heat and pressure.

After the toner image Tn is fixed, the recording sheet S passes through the gate MG while elastically deforming the gate MG, and is transported to the output path SH2. The sheet S to be output to the paper output tray TRh is transported by the transport rollers Rb, and is output to the paper output tray TRh by the output rollers Rh.

In the case of duplex printing, a sheet S having a first surface that has been printed is transported downstream by the transport rollers Rb and the output rollers Rh until a trailing edge of the sheet S passes through the gate MG. After the trailing edge of the sheet S passes through the gate MG, the transport rollers Rb and the output rollers Rh reversely rotate to transport the sheet S from the output path SH2 toward the inverting path SH3. That is, the transport direction is reversed, and the sheet S is switched back. The switched-back sheet S is guided by the gate MG, and is transported through the inverting path SH3. After passing through the inverting path SH3, the sheet S joins the transport path SH1, and is transported in an inverted state to the registration rollers Rr. Then, in the transfer area Q3, an image is printed on a second surface of the sheet S.

Description of Exhaust System

Figure 2:
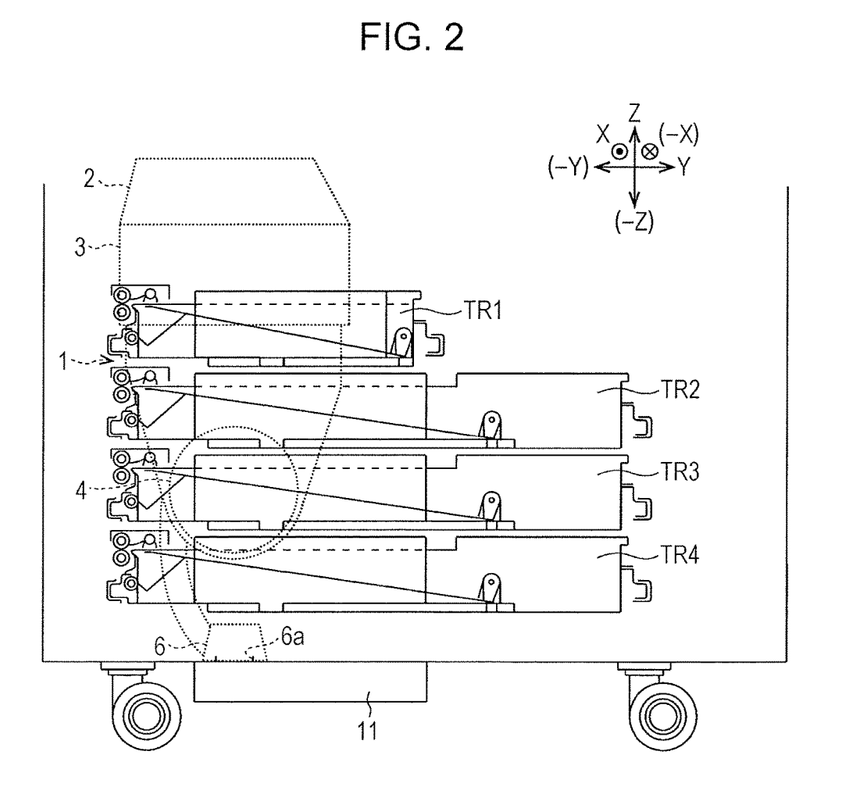
FIG. 2 is an explanatory view of an exhaust system when a lower part of the image forming apparatus of the first exemplary embodiment is viewed from the front side.

FIG. 2 is an explanatory view of an exhaust system when the lower part of the image forming apparatus of the first exemplary embodiment is viewed from the front side.

Referring to FIG. 2, in the lower part of the copying machine U of the first exemplary embodiment, an exhaust system 1 is installed in a left part on the rear (depth) side of the paper feed trays TR1 to TR4. The exhaust system 1 includes a suction unit 2 to which an unillustrated duct extending near the charging roller CR, the developing device G, and the transfer unit TU is connected. Under the suction unit 2, a main filter 3 is disposed as an example of a powder removing member. The main filter 3 removes various kinds of powders contained in air sucked from the suction unit 2, for example, developer, a discharge product, paper dust, and an additive contained in the developer. Below the main filter 3, a suction fan 4 is disposed as an example of a gas transfer device. The suction fan 4 sucks gas through the duct. Below the suction fan 4, a discharge unit 6 on the apparatus body side is connected. The discharge unit 6 on the apparatus body side has a discharge port 6a through which the gas sucked by the suction fan 4 is to be discharged downward from a lower surface of the copying machine U.

Figure 3A:
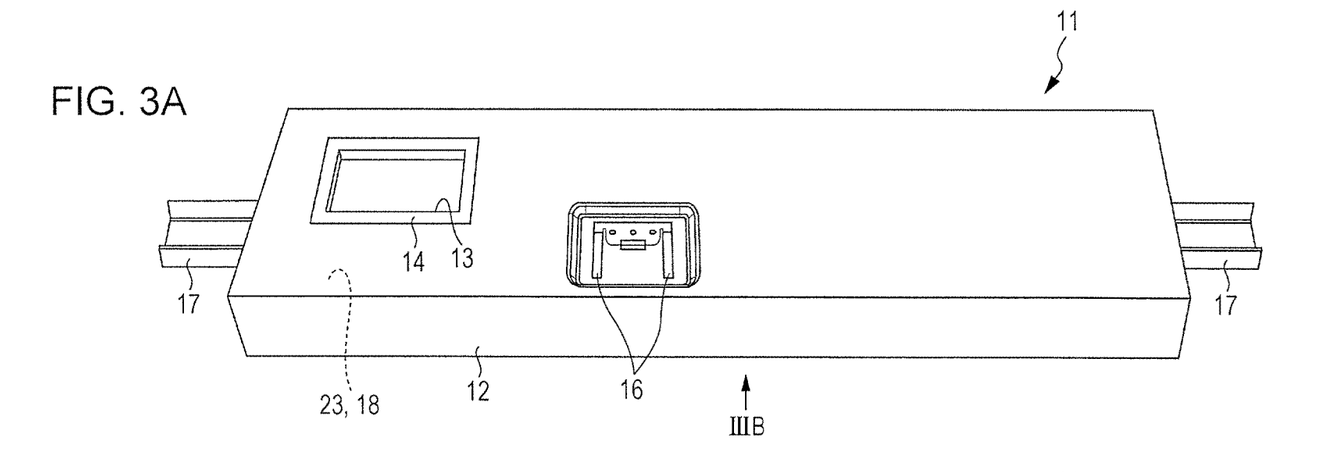
FIG. 3A is a perspective view of the gas purification device when viewed from an obliquely upper front side.
Figure 3B:
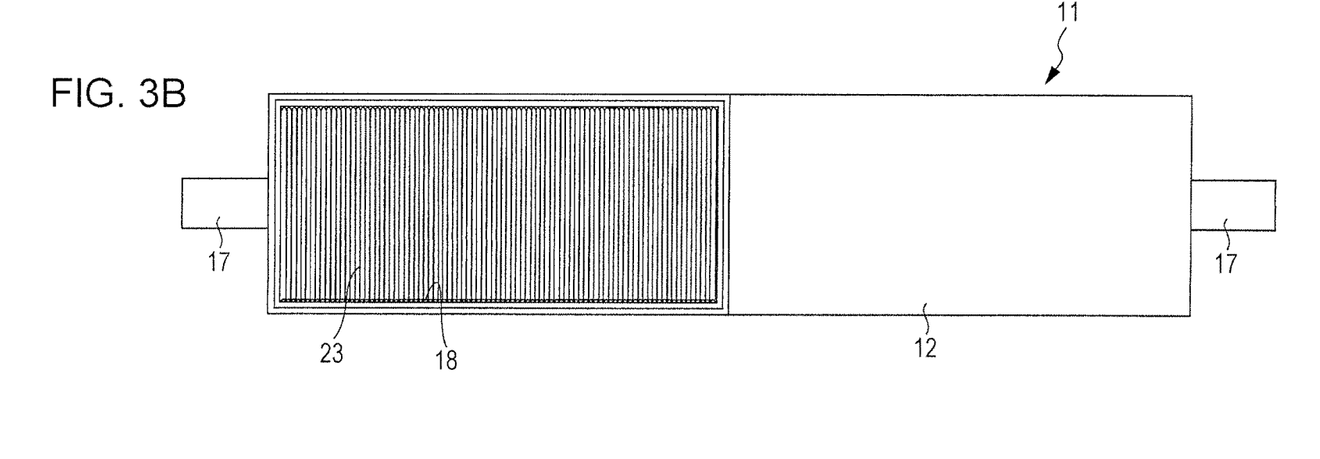
FIG. 3B is a bottom view of the gas purification device.

FIGS. 3A and 3B are explanatory views of a gas purification device according to the first exemplary embodiment. FIG. 3A is a perspective view of the gas purification device, when viewed from the obliquely upper front side, and FIG. 3B is a bottom view of the gas purification device.

Figure 4:
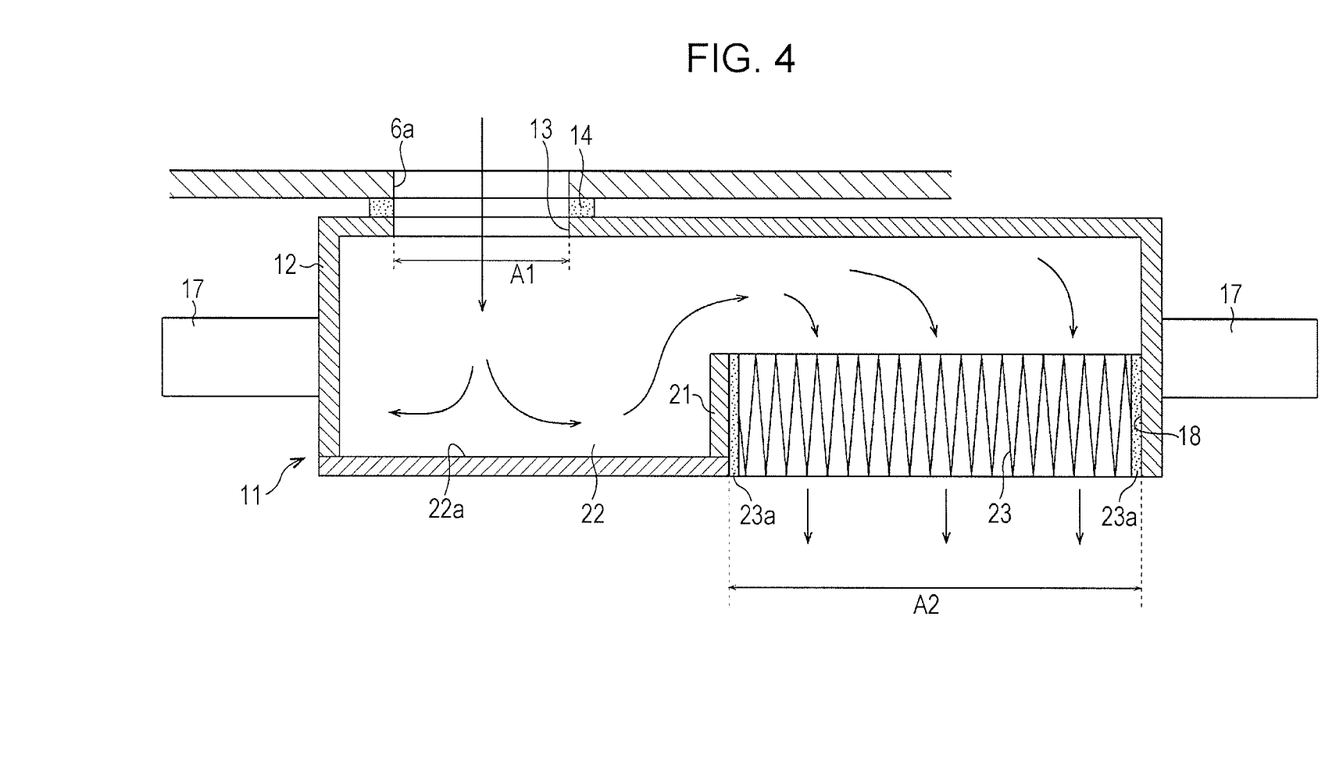
FIG. 4 is a cross-sectional view of the gas purification device of the first exemplary embodiment.

FIG. 4 is a cross-sectional view of the gas purification device of the first exemplary embodiment.

Referring to FIG. 2, on the lower surface of the copying machine U of the first example embodiment, a filter unit 11 serving as an example of a gas purification device is detachably supported as an additional attachment unit, that is, a so-called option unit.

In FIGS. 3A, 3B, and 4, the filter unit 11 includes a casing 12 shaped like a rectangular parallelepiped. In a left rear portion of an upper surface of the casing 12, an intake port 13 is provided as an example of an inflow port. The intake port 13 is provided at a position and in a size corresponding to those of the discharge port 6a.

On the upper surface of the casing 12, a sponge 14 serving as an example of a sealing member is supported to surround the intake port 13.

In FIG. 3A, in a center portion in the right-left direction of the upper surface of the casing 12, an attachment claw 16 is supported as an example of an attachment portion. The attachment claw 16 is caught by an unillustrated aperture provided in the lower surface of the copying machine U to support the filter unit 11 on the lower surface of the copying machine U.

In FIGS. 3A, 3B, and 4, handles 17 are respectively supported on right and left side walls of the casing 12. The operator can grip the handles 17 when attaching or detaching the filter unit 11.

On the right side of a lower surface of the casing 12, an exhaust port 18 is provided as an example of an outflow port. As illustrated in FIGS. 3A and 4, the exhaust port 18 of the first exemplary embodiment is located at a position such as not to overlap with the intake port 13, when viewed from above. An aperture area A2 of the exhaust port 18 is larger than an aperture area A1 of the intake port 13. That is, A1 is set to be less than A2.

Referring to FIG. 4, within the casing 12, a partition 21 serving as an example of a partitioning member is provided at a position corresponding to an end portion of the exhaust port 18.

The partition 21 extends upward from its lower end. An upper end of the partition 21 is disposed at a sufficient distance from an upper plate of the casing 12.

Within the casing 12, a collection space 22 serving as an example of a collecting portion is defined by a space provided below the intake port 13 and partitioned from the exhaust port 18 by the partition 21.

On the right side of the partition 21, an option filter 23 serving as an example of a powder removing member is supported above the exhaust port 18. On an outer periphery of the option filter 23, a sponge 23a is supported as an example of a sealing member. The option filter 23 is attached from the exhaust port 18 in a state in which the sponge 23a is compressed. By elastic restoring force of the sponge 23a, the option filter 23 is held within the casing 12.

Description of Functions of Exhaust System 1 and Filter Unit 11

In the copying machine U of the first exemplary embodiment having the above-described configuration, during an image forming operation, a discharge product sometimes occurs in the charging area Q0, the developer sometimes floats in the developing area Q2, or paper dust, floating developer, and a discharge product sometimes occur in the transfer area Q3. Powder, such as floating developer and paper dust, is sucked by the suction fan 4 of the exhaust system 1, and is collected and removed by the main filter 3.

When the copying machine U performs image formation in a hot and humid environment or performs image formation at high speed to obtain a large number of prints per unit time, the developer is susceptible to deterioration, and floating developer, that is, a so-called toner cloud is likely to occur. Also, when printing of high image density is repeated, floating developer is likely to occur. In these cases, the main filter 3 collects a large quantity of powder, and it is difficult for the main filter 3 to completely collect the powder. When the filter unit 11 is not attached, the powder left without being collected by the main filter 3 is discharged from the discharge port 6a, and this sometimes soil the floor surface.

In contrast to this, the filter unit 11 is attached to the discharge port 6a in the first exemplary embodiment. Therefore, powder left without being collected by the main filter 3 is collected and removed by the filter unit 11.

In the filter unit 11 of the first exemplary embodiment, the collection space 22 is provided below the intake port 13, and the option filter 23 is disposed on the right side of the collection space 22 with the partition 21 being disposed therebetween. Hence, exhaust air flowing in the filter unit 11 strikes a bottom surface 22a of the collection space 22 on the downstream side of the intake port 13 and below the intake port 13 in the gravitational direction. The exhaust air striking the bottom surface 22a of the collection space 22 is exhausted outside through the option filter 23 that does not overlap with the intake port 13 when viewed from above.

Therefore, the exhaust air flowing in from the intake port 13 does not directly strike the option filter 23. Before the exhaust air passes through the option filter 23, part of powder contained in the exhaust air falls off the flow of exhaust air in the collection space 22, and accumulates in the collection space 22.

In the first exemplary embodiment, the exhaust air flowing downward in the gravitational direction from the intake port 13 strikes the bottom surface 22a of the collection space 22, and then flows toward the option filter 23. At this time, the exhaust air moves in the upward direction opposite from the gravitational direction. Herein, a force inertially directed downward acts on the powder that moves downward in the gravitational direction together with the exhaust air flowing in from the intake port 13. Further, even if the powder is going to move upward in the gravitational direction, the gravitational force also acts to move the powder downward. Hence, in the first exemplary embodiment, when the exhaust air moves upward, the inertial force and gravitational force act on the powder in the direction opposite from the flow direction of the exhaust air.

In the first exemplary embodiment, the aperture area A2 of the exhaust port 18 is larger than the aperture area A1 of the intake port 13. Therefore, the aperture area A2 of the option filter 23 set at the exhaust port 18 is larger than the aperture area A1 of the intake port 13. Hence, the flow speed of the gas is lower when passing through the option filter 23 than when being sucked from the intake port 13.

In the first exemplary embodiment, a projection area when the collection space 22 is viewed from above, that is, the area of the bottom surface 22a is set to be larger than the aperture area A1 of the intake port 13. Hence, the speed of the flow directed upward is lower than the speed of the downward exhaust air sucked downward in the gravitational direction from the intake port 13. While the force for whirling the powder upward is strong when the speed of the upward flow is high, the speed of the upward flow is decreased in the first exemplary embodiment. Thus, the powder is not easily whirled up.

Second Exemplary Embodiment

Figure 5:
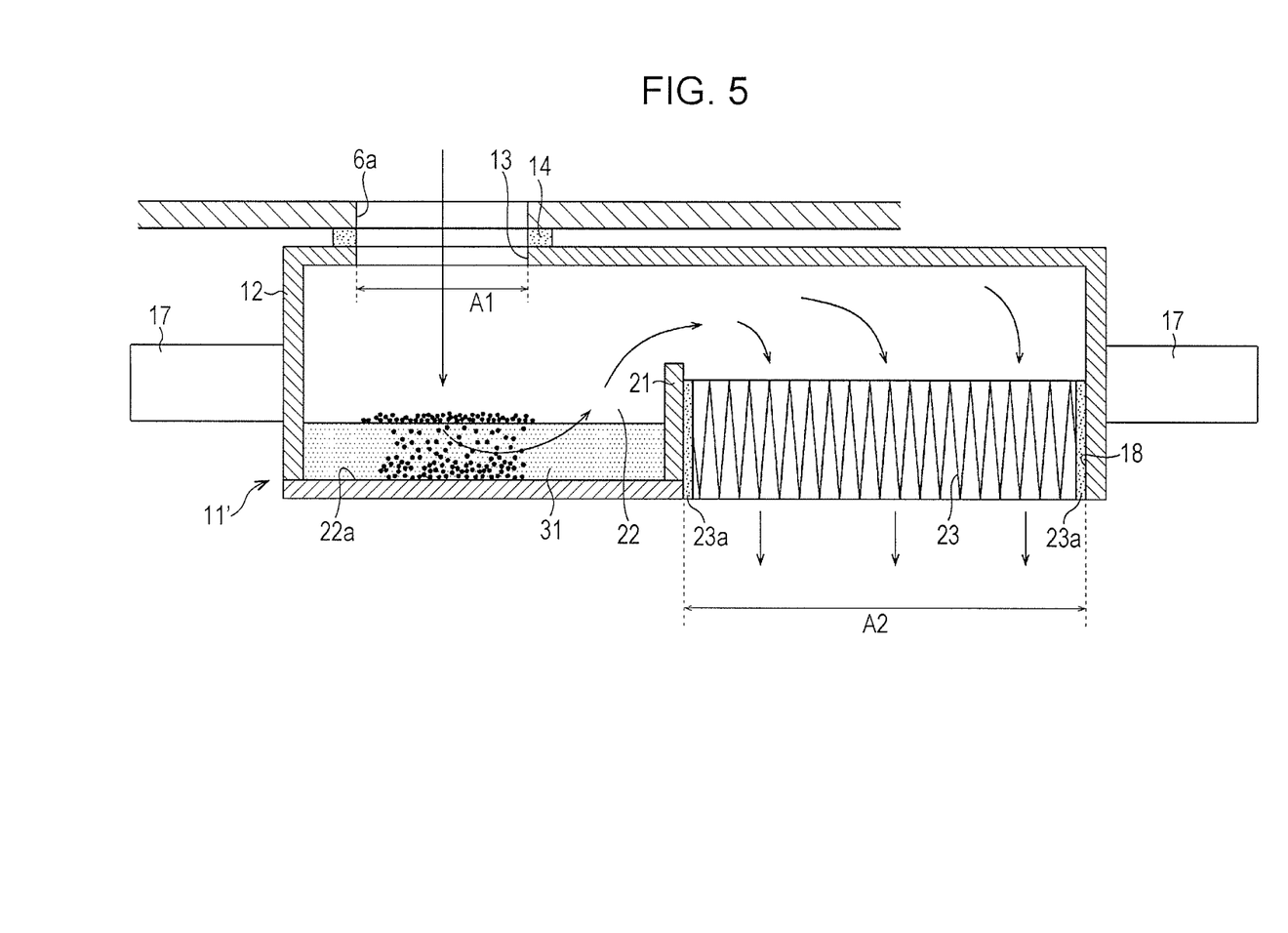
FIG. 5 is an explanatory view of a gas purification device according to a second exemplary embodiment, and corresponds to FIG. 4 illustrating the first exemplary embodiment.

FIG. 5 is an explanatory view of a gas purification device according to a second exemplary embodiment of the present invention, and corresponds to FIG. 4 illustrating the first exemplary embodiment.

Next, the second exemplary embodiment will be described. In the description of the second exemplary embodiment, constituent elements corresponding to the constituent elements of the first exemplary embodiment are denoted by the same reference numerals, and detailed descriptions thereof are skipped.

The second exemplary embodiment is different from the first exemplary embodiment in the following point, but is configurated similarly to the first exemplary embodiment in the other points.

Referring to FIG. 5, in a filter unit 11' serving as an example of a gas purification device according to the second exemplary embodiment, a prefilter 31 serving as an example of a second removing member is disposed in a collection space 22. The prefilter 31 of the second exemplary embodiment is formed by a filter that is coarser than an option filter 23.

In the filter unit 11' of the second exemplary embodiment having the above-described structure, exhaust air flowing in the collection space 22 passes through the coarse prefilter 31. At this time, even if powder falling off the flow of exhaust air is going to be whirled up, it is likely to be collected by the prefilter 31.

Third Exemplary Embodiment

Figure 6:
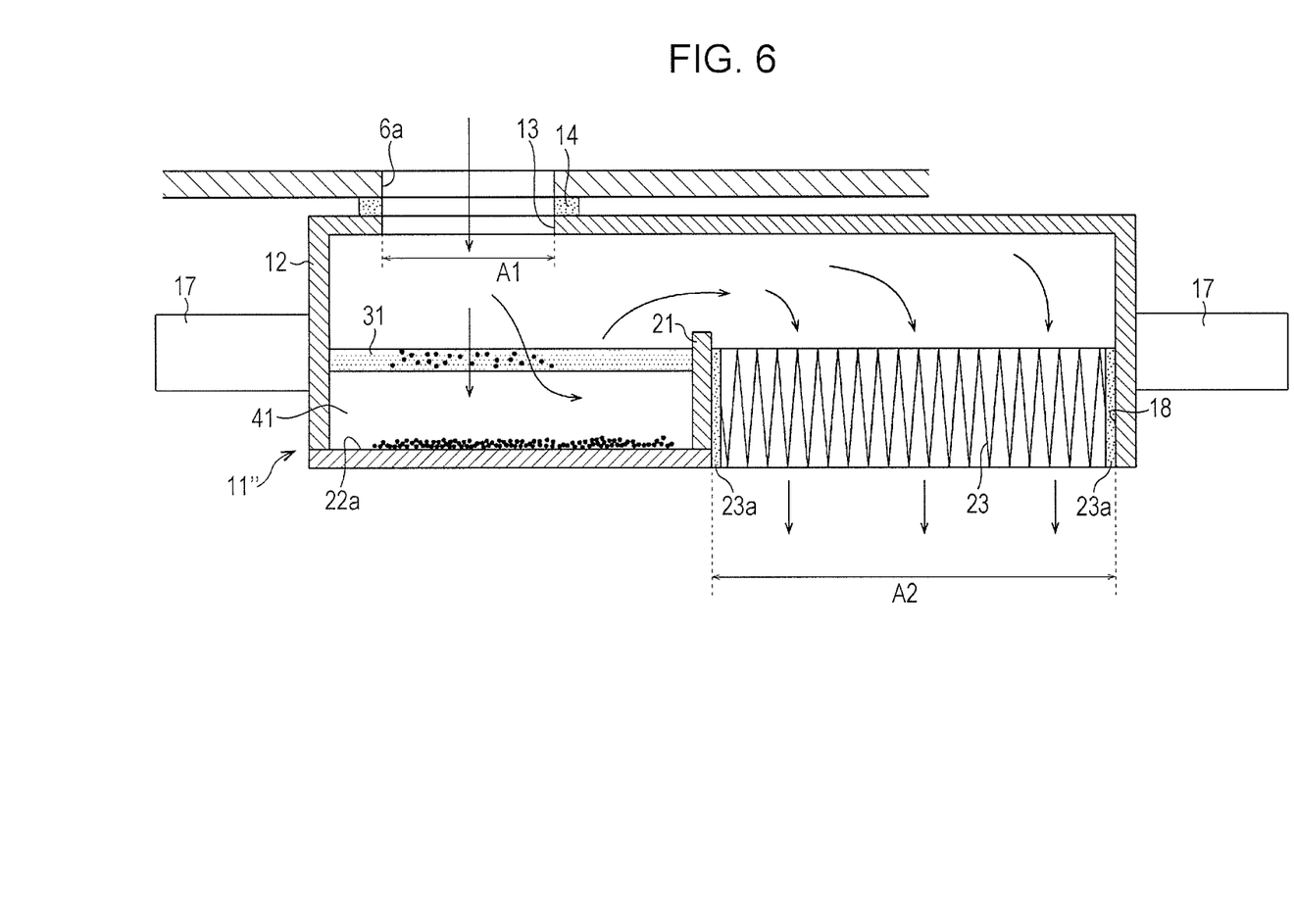
FIG. 6 is an explanatory view of a gas purification device according to a third exemplary embodiment, and corresponds to FIG. 4 illustrating the first exemplary embodiment.

FIG. 6 is an explanatory view of a gas purification device according to a third exemplary embodiment of the present invention, and corresponds to FIG. 4 illustrating the first exemplary embodiment.

Next, the third exemplary embodiment will be described. In the description of the third exemplary embodiment, constituent elements corresponding to the constituent elements of the first and second exemplary embodiments are denoted by the same reference numerals, and detailed descriptions thereof are skipped.

The third exemplary embodiment is different from the first and second exemplary embodiments in the following point, but is configurated similarly to the first and second exemplary embodiments in the other points.

Referring to FIG. 6, in a filter unit 11" serving as an example of a gas purification device according to the third exemplary embodiment, a lower surface of a prefilter 31 is disposed to form a space 41 between the lower surface of the prefilter 31 and a bottom surface 22a of a collection space 22. That is, the prefilter 31 is raised above the bottom surface 22a. Similarly to the second exemplary embodiment, the prefilter 31 is formed by a filter that is coarser than an option filter 23.

In the filter unit 11" of the third exemplary embodiment having the above-described structure, powder falling off an exhaust air flow in the collection space 22 can be held in the space 41 between the bottom surface 22a and the prefilter 31.

Modifications

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents. Modifications (H01) to (H04) of the present invention will be described below.

(H01) While the copying machine U has been described as an example of an image forming apparatus in the above exemplary embodiments, the present invention is not limited thereto. For example, the present invention is also applicable to a printer, a facsimile machine, or a multifunctional machine having the functions of these plural machines. Further, the present invention is not limited to a monochromatic image forming apparatus, and is also applicable to a multicolor image forming apparatus.

(H02) While the filter unit 11, 11', or 11" disposed on the downstream side of the main filter 3 has been described as the gas purification device in the exemplary embodiments, the present invention is not limited thereto. For example, the filter unit 11, 11', or 11" can be adopted as the main filter 3.

(H03) While the filter unit 11, 11', or 11" is not provided with an exhaust device, such as a fan, in the above exemplary embodiments, the present invention is not limited thereto. A gas transfer device, such as a fan, a blower, or a pump, can be disposed on the side of the intake port 13 or the side of the exhaust port 18.

(H04) While the aperture areas A1 and A2 preferably have the relationship of A1<A2 in the exemplary embodiments, they can have a relationship of A1≥A2.

(H05) While the option filter 23 is preferably provided in the exemplary embodiments, it may be omitted when powder contained in exhaust air sucked from the intake port 13 can be sufficiently collected only in the collection space 22. Only the prefilter 31 can be provided without using the option filter 23.

What is claimed is:

1. A gas purification device that is detachably mounted over a discharge port of an image forming apparatus body, the discharge port discharges gas from the inside of the image forming apparatus body, the gas purification device comprising:
    a removing member that removes powder contained in the gas and has a first surface and a second surface, the first surface being disposed to face the discharge port, wherein the gas discharged from the discharge port enters the first surface and is discharged from the second surface;
    a casing that has an inner surface, the inner surface being disposed to face the second surface with a gap therebetween, wherein the gas discharged from the second surface passes through the gap and strikes the inner surface; and
    an outflow port that flows out the gas from the gas purification device and is disposed at a different position from the inner surface,
    wherein the length of the casing in a discharging direction in which the gas is discharged from the discharge port is shorter than in an intersecting direction against the discharging direction in which the removing member and the outflow port are adjacent to each other.

2. The gas purification device according to claim 1, wherein the position of the outflow port is not overlapped with the discharge port in the discharging direction.

3. The gas purification device according to claim 2, wherein the position of the outflow port is not disposed at downstream side of an outside surface of the casing in the discharging direction.

4. The gas purification device according to claim 3, wherein the outflow port faces toward the direction of gravitational force.

5. The gas purification device according to claim 2, wherein the outflow port faces toward the direction of gravitational force.

6. The gas purification device according to claim 1, wherein the position of the outflow port is not disposed at downstream side of an outside surface of the casing in the discharging direction.

7. The gas purification device according to claim 6, wherein the outflow port faces toward the direction of gravitational force.

8. The gas purification device according to claim 1, wherein the outflow port faces toward the direction of gravitational force.

9. The gas purification device according to claim 1, wherein the position of the outflow port is not overlapped with the discharge port in a direction which is perpendicular to the inner surface.

* * * * *